United States Patent
Masuda

(10) Patent No.: US 8,325,051 B2
(45) Date of Patent: Dec. 4, 2012

(54) INFORMATION PROCESSING APPARATUS

(75) Inventor: Atsushi Masuda, Musashino (JP)

(73) Assignee: Fujitsu Toshiba Mobile Communications Limited, Kawasaki (JP)

(*) Notice: Subject to any disclaimer, the term of this patent is extended or adjusted under 35 U.S.C. 154(b) by 338 days.

(21) Appl. No.: 12/699,227

(22) Filed: Feb. 3, 2010

(65) Prior Publication Data

US 2011/0006905 A1   Jan. 13, 2011

(30) Foreign Application Priority Data

Jul. 7, 2009 (JP) ............... P2009-161226

(51) Int. Cl.
*G08B 21/00* (2006.01)
*H02J 7/14* (2006.01)
*H02J 7/00* (2006.01)

(52) U.S. Cl. ............. 340/636.1; 320/105; 320/122

(58) Field of Classification Search .............. None
See application file for complete search history.

(56) References Cited

U.S. PATENT DOCUMENTS

| | | | | |
|---|---|---|---|---|
| 5,646,507 A | * | 7/1997 | Timmons et al. | 320/149 |
| 5,804,945 A | * | 9/1998 | Sato et al. | 320/134 |
| 6,194,793 B1 | * | 2/2001 | Fisher, Jr. | 307/66 |
| 6,229,280 B1 | * | 5/2001 | Sakoh et al. | 320/106 |
| 6,462,507 B2 | * | 10/2002 | Fisher, Jr. | 320/101 |
| 6,661,203 B2 | * | 12/2003 | Wolin et al. | 320/134 |
| 6,850,040 B2 | * | 2/2005 | Xiong et al. | 320/134 |
| 7,545,118 B2 | * | 6/2009 | Kim | 320/128 |
| 7,573,235 B2 | * | 8/2009 | Hand | 320/122 |
| 7,589,503 B2 | * | 9/2009 | Hsieh | 320/149 |
| 2008/0061739 A1 | * | 3/2008 | Lu | 320/114 |

FOREIGN PATENT DOCUMENTS

| | | |
|---|---|---|
| JP | 08-088940 A | 4/1996 |
| JP | 2008-228391 A | 9/2008 |

* cited by examiner

*Primary Examiner* — George Bugg
*Assistant Examiner* — Renee Dorsey
(74) *Attorney, Agent, or Firm* — Maschoff Gilmore & Israelsen

(57) ABSTRACT

An information processing apparatus includes: a rechargeable battery that is electrically connected to a charging electric power generating device; a switch that is disposed between the rechargeable battery and the charging electric power generating device; an electric power measuring unit that measures electric power produced by the charging electric power generating device; and a charge controller that controls the switch to be turned OFF when the electric power measured by the electric power measuring unit is smaller than a first electric power threshold.

11 Claims, 8 Drawing Sheets

INFORMATION PROCESSING APPARATUS

CROSS-REFERENCE TO THE RELATED APPLICATION(S)

The present application is based upon and claims priority from prior Japanese Patent Application No. 2009-161226, filed on Jul. 7, 2009, the entire contents of which are incorporated herein by reference.

BACKGROUND

1. Field

The present invention relates to an information processing apparatus capable of charging a battery provided therein.

2. Description of the Related Art

A mobile information processing apparatus such as a mobile communication apparatus which is operated by electric power stored in a rechargeable battery is known. As such a rechargeable battery, a lithium-ion secondary battery is widely used. Such an apparatus notifies the amount of electric power stored in a lithium-ion secondary battery, and controls a charging operation. Specifically, in the case where a battery charger which converts electric power supplied from a commercial power source to charging electric power is connected to the apparatus, when the battery reaches full charge, the apparatus stops the charging operation to prevent the battery from being overcharged. Here, full charge means a state where the charging operation is completed. The battery charger supplies stable electric power which can charge the battery to the full charge state. During the charging operation, a charge indicator LED is turned ON.

On the other hand, when informed that the amount of stored electric power is small, the user of the apparatus connects the battery charger to the apparatus to perform the charging operation. After the apparatus was connected to the battery charger, the apparatus starts the charging operation and turns ON the charge indicator LED. When informed by turning-OFF of the LED of the completion of the charging operation, the battery charger is disconnected from the apparatus by the user. Also in the case of a charging operation by electric power stored in a dry cell, or by electric power generated by a hand crank generator, the charging operation is performed by electric power of a level similar to the charging electric power supplied from a commercial power source. Therefore, the charge control on the apparatus is performed in the same manner as the case of a commercial power source.

In the case where a rechargeable battery of a mobile information processing apparatus is charged by electric power generated by a solar cell which directly converts light energy to electric power by using the photoelectromotive force effect, the electric power is largely varied depending on light impinging on the solar cell, and hence it is known that the charge control is performed in a complex manner which is different from that in the case of charging by charging electric power converted from a commercial power source (for example, see JP-A-2008-228391). On the other hand, it is known that a solar cell and a rechargeable battery are directly connected to each other through a diode for preventing reverse flow of electric power (for example, see JP-A-8-088940).

In the method disclosed in the publication, JP-A-2008-228391, in the case where the electric power generated by the solar cell is small, however, the electric power may be insufficient for supplying electric power to be consumed in the complex charge control which is to be performed when the solar cell is connected, and the solar cell may consume electric power stored in the rechargeable battery.

The method disclosed in the publication, JP-A-8-088940, has a problem in that the charging operation is not performed at an appropriate charging voltage. When the charging operation is performed at an excessively high charging voltage, there is a possibility that the rechargeable battery is overcharged. When the charging operation is performed at an excessively low charging voltage, there is a possibility that the rechargeable battery is in a near full charge state for a long time period. When being overcharged or being in a near full charge state for a long time period, a lithium-ion secondary battery which is widely used in a mobile communication apparatus is deteriorated. Therefore, the charging operation by the method is not appropriate.

When such an apparatus is designed so that the voltage at which electric power is generated by a solar dell is slightly higher than that in the discharging process of a rechargeable battery, the above-discussed problem is mitigated. In the design, however, the storage battery cannot be charged to the full charge, and hence there arises a problem in that the storage capability of the battery cannot be sufficiently used.

In the method disclosed in the publication, JP-A-8-088940, moreover, charging and discharging operations are repeated without causing the storage battery to be charged to the full charge, with the result that there arises a problem in that the so-called memory effect possibly occurs in which the storage capability is reduced to the level of the amount of electrical power that is charged during the repeated charging and discharging operations. The memory effect is observed in a nickel-metal-hydride battery and a nickel-cadmium battery. In the above-described design in which the voltage at which electric power is generated by a solar dell is lowered, the problem is remarkable.

SUMMARY

One of objects of the present invention is to provide an information processing apparatus capable of appropriately charging a rechargeable battery by performing charge control while reducing electric power that is consumed in the charge control.

According to a first aspect of the present invention, there is provided an information processing apparatus including: a rechargeable battery that is electrically connected to a charging electric power generating device; a switch that is disposed between the rechargeable battery and the charging electric power generating device; an electric power measuring unit that measures electric power produced by the charging electric power generating device; and a charge controller that controls the switch to be turned OFF when the electric power measured by the electric power measuring unit is smaller than a first electric power threshold.

According to a second aspect of the present invention, there is provided an information processing apparatus including: an indicator; a rechargeable battery that is electrically connected to a charging electric power generating device; a switch that is disposed between the rechargeable battery and the charging electric power generating device; an electric power measuring unit that measures electric power produced by the charging electric power generating device; and a charge controller that operates to: (a) turn OFF the indicator and the switch when the electric power is smaller than a first electric power threshold while charging operation of the rechargeable battery is not completed; (b) turn OFF the indicator and turn ON the switch when the electric power is equal to or larger than the first electric power threshold and smaller than a second electric power threshold that is higher than the first electric power threshold while the charging operation is not completed; (c) turn ON the indicator and the switch when the electric power is equal to or larger than the second electric power threshold while the charging operation is not completed; and (d) turn OFF the indicator and the switch when the charging operation is completed.

According to a third aspect of the present invention, there is provided an information processing apparatus including: an indicator; a rechargeable battery that is electrically connected to a first charging electric power generating device and a second charging electric power generating device; a first switch that is disposed between the rechargeable battery and the first charging electric power generating device; a second switch that is disposed between the rechargeable battery and the second charging electric power generating device; an electric power measuring unit that measures first electric power produced by the first charging electric power generating device; and a charge controller that operates to: (a) turn ON the indicator and the second switch when a second electric power is supplied from the second charging electric power generating device while charging operation of the rechargeable battery is not completed; (b) turn OFF the indicator and the first switch when the first electric power is smaller than a first electric power threshold while charging operation of the rechargeable battery is not completed and while the second electric power is not being supplied; (c) turn OFF the indicator and turn ON the first switch when the first electric power is equal to or larger than the first electric power threshold and smaller than a second electric power threshold that is higher than the first electric power threshold while the charging operation is not completed and while the second electric power is not being supplied; and (d) turn ON the indicator and the first switch when the electric power is equal to or larger than the second electric power threshold while the charging operation is not completed and while the second electric power is not being supplied.

According to a fourth aspect of the present invention, there is provided an information processing apparatus including: an indicator; a rechargeable battery that is electrically connected to a first charging electric power generating device and a second charging electric power generating device; a first switch that is disposed between the rechargeable battery and the first charging electric power generating device; a second switch that is disposed between the rechargeable battery and the second charging electric power generating device; an electric power measuring unit that measures first electric power produced by the first charging electric power generating device; and a charge controller that operates to: (a) turn ON the indicator and the second switch when a second electric power is supplied from the second charging electric power generating device while charging operation of the rechargeable battery is not completed; (b) turn OFF the indicator and turn ON the first switch when the first electric power is smaller than a second electric power threshold while charging operation of the rechargeable battery is not completed and while the second electric power is not being supplied; and (c) turn ON the indicator and turn OFF the first switch when the first electric power is equal to or larger than the second electric power threshold while the charging operation is not completed and while the second electric power is not being supplied, wherein the first charging electric power generating device includes a solar cell, wherein the second charging electric power generating device includes a battery charger that converts a commercial power source to the second electric power for charging the rechargeable battery, and wherein the second electric power threshold is equal to electric power supplied from the second charging electric power generating device.

BRIEF DESCRIPTION OF THE DRAWINGS

A general configuration that implements the various features of the present invention will be described with reference to the drawings. The drawings and the associated descriptions are provided to illustrate embodiments of the invention and not to limit the scope of the invention.

DETAILED DESCRIPTION

Figure 1:
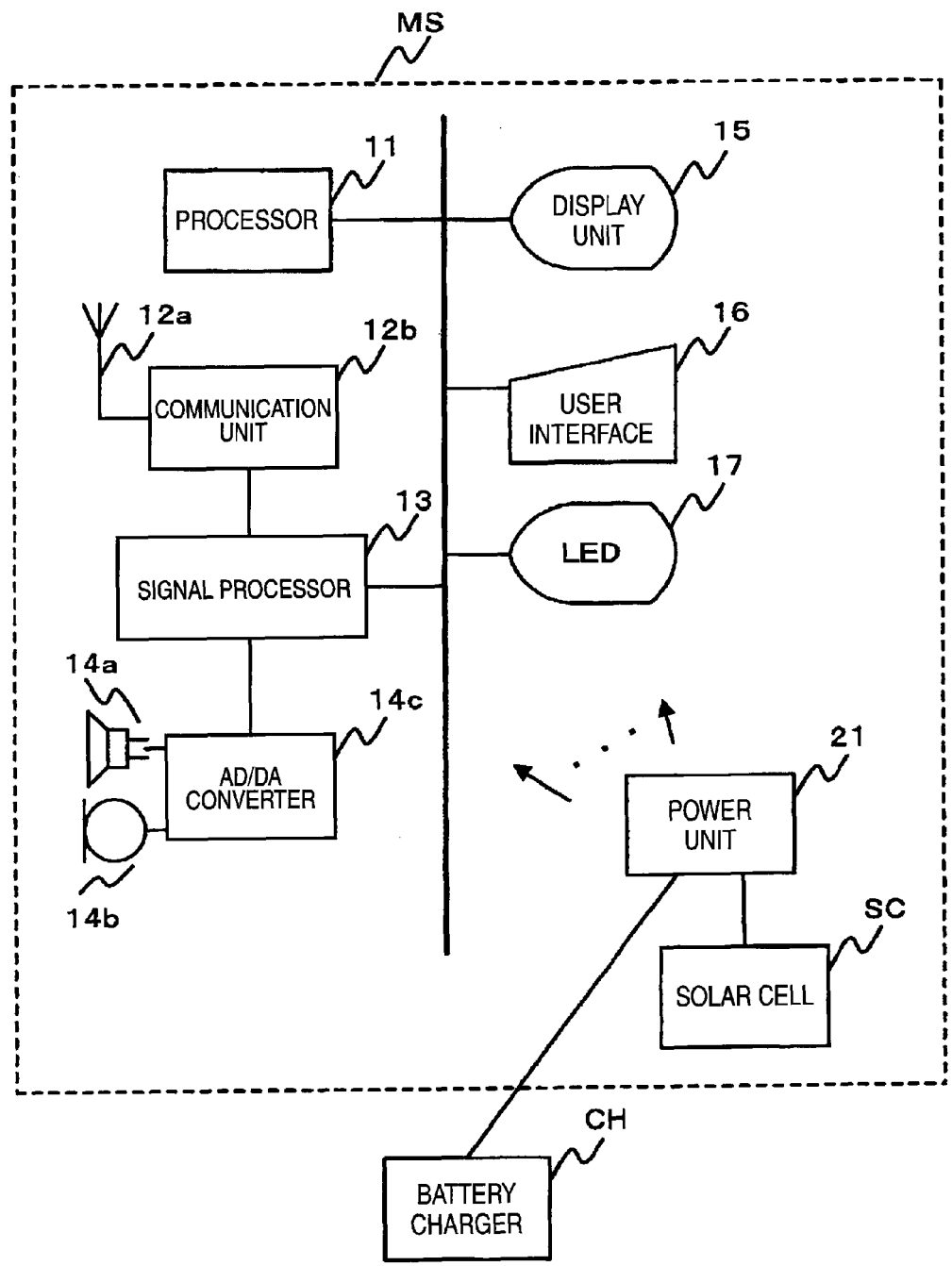
FIG. 1 is a block diagram showing a configuration of a mobile communication apparatus of a first embodiment of the invention.

An embodiment according to the present invention will be described in detail with reference to the accompanying drawings. The scope of the claimed invention should not be limited to the examples illustrated in the drawings and those described below.

Hereinafter, an embodiment of a mobile communication apparatus to which an information processing apparatus of an embodiment of the invention is applied will be described with reference to the drawings.

First Embodiment

FIG. 1 is a block diagram showing the configuration of a mobile communication apparatus of a first embodiment of the invention. The mobile communication apparatus MS is configured by: a processor 11 which controls other components provided in the mobile communication apparatus MS; an antenna 12a which transmits and receives radio waves to and from a base station (not shown) of a mobile communication network; a communication unit 12b; a signal processor 13; a speaker 14a for receiving a voice message; a microphone 14b for sending a voice message; a AD/DA converter 14c; a display unit 15; an user interface 16, an LED (Light Emitting Diode) 17; a power unit 21 which is connected to a battery charger CH for converting electric power supplied from a commercial power source to charging electric power; and a solar cell SC which directly converts light energy to electric power by using the photoelectromotive force effect.

Figure 2:
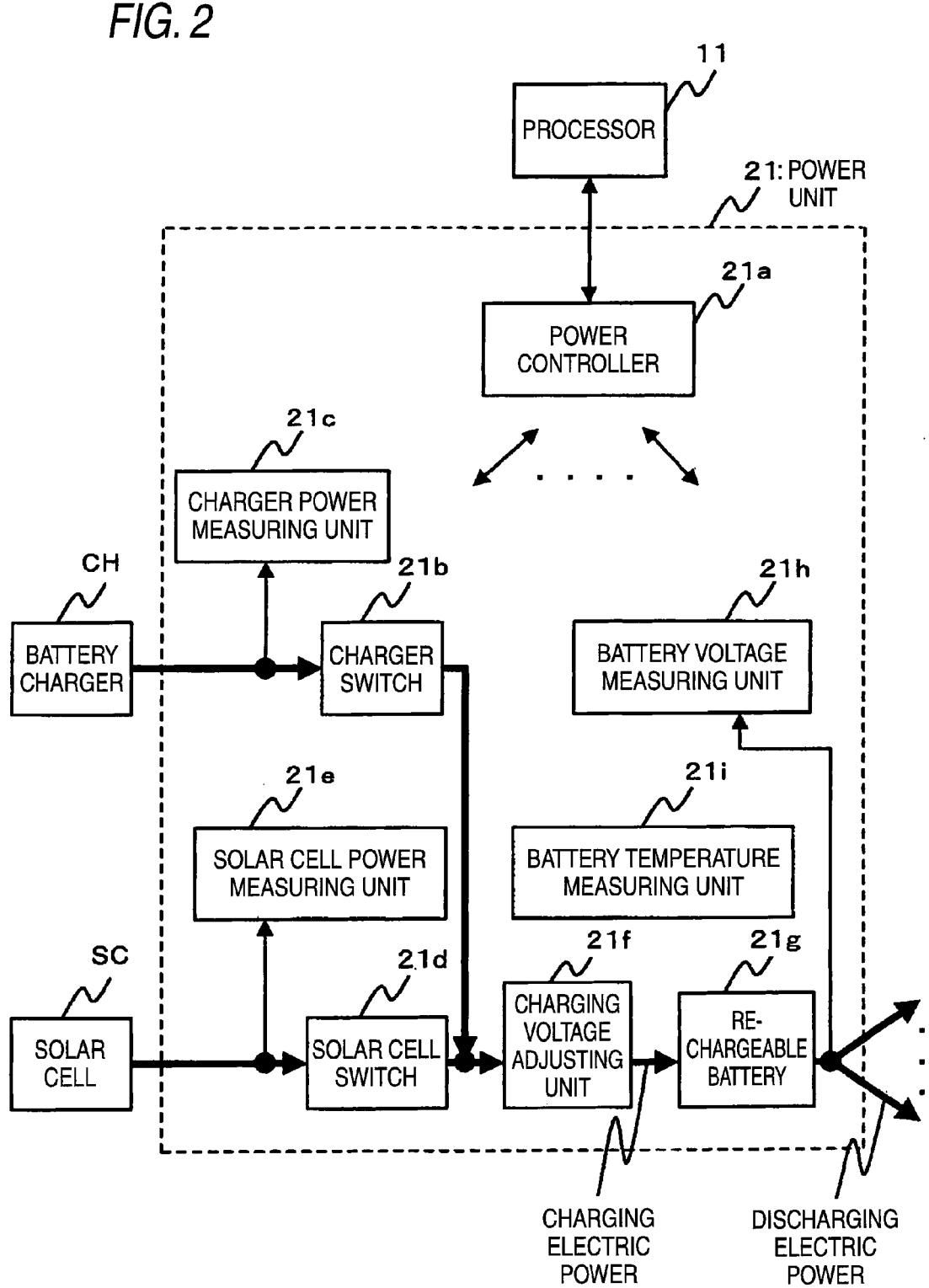
FIG. 2 is a block diagram showing a configuration of a power unit in the first embodiment of the invention.

FIG. 2 is a block diagram showing in detail a configuration of the power unit 21. The power unit 21 is configured by: a power controller 21a which controls the power unit 21 while being controlled by the processor 11; a charger switch 21b to which the charging electric power from the battery charger CH is supplied through a detachable first connector (not shown); a charger power measuring unit 21c; a solar cell switch 21d to which the charging electric power from the solar cell SC is supplied; a solar cell power measuring unit 21e; a charging voltage adjusting unit 21f; a rechargeable battery 21g which is a lithium-ion secondary battery; a battery voltage measuring unit 21h; and a battery temperature measuring unit 21i which is disposed in the vicinity of the rechargeable battery 21g. When the power of the mobile communication apparatus MS is turned ON, the charger switch 21b and the solar cell switch 21d are turned OFF. In the figure, the thick lines indicate the direction of electrical current.

The operations of various components of the thus configured mobile communication apparatus MS of the first embodiment of the invention will be described with reference to FIGS. 1 and 2.

The communication unit 12b supplies a high-frequency signal which is received by the antenna 12a, to the signal processor 13, and transmits a high-frequency signal which is output from the signal processor 13, through the antenna 12a.

The signal processor 13 amplifies, converts frequency, and demodulates the high-frequency signal which is output from the communication unit 12b, and sends a digital audio signal which is obtained by the processes, to the AD/DA converter 14c, and a control signal including an incoming signal, to the processor 11. Furthermore, the signal processor modulates, frequency converts, and amplifies a digital audio signal which is output from the AD/DA converter 14c, and a control signal which is output from the processor 11, to obtain a high-frequency signal, and then sends the high-frequency signal to the communication unit 12b.

The AD/DA converter 14c converts the digital audio signal which is output from the signal processor 13, to an analog audio signal, amplifies the analog audio signal, and then sends the amplified analog audio signal to the speaker 14a. Furthermore, the AD/DA converter amplifies an analog audio signal which is output from the microphone 14b, converts the analog audio signal to a digital audio signal, and then transmits the amplified digital audio signal to the signal processor 13.

The display unit 15 is a backlit LCD which is used for, for example, displaying a message requesting the user to operate the apparatus, the contents of the operation performed by the user, or the operation status of the apparatus including information of charging of the rechargeable battery 21g. The display unit is controlled by the processor 11 so as to display an image containing a cursor, characters, and numerals. The displayed data are switched over in response to an operation input through the user interface 16, or instructions from the processor 11.

When a key operation is not conducted on the user interface 16 for a predetermined time period, the display unit 15 interrupts the displaying operation in response to instructions from the processor 11, to turn OFF a backlight, thereby reducing the power consumption. When an operation is conducted on any key of the user interface 16, or a display request is issued from one of the various portions, the interrupted display is resumed in response to instructions from the processor 11.

The user interface 16 is configured by keys including: numeral keys for designating the telephone number of the communication partner, and inputting characters such as alphabet, symbol, and number; and a plurality of function keys including cursor moving keys and scroll keys. When one of the keys of the user interface 16 is pressed, the identifier of the key is sent to the processor 11.

Under the control of the processor 11, the LED 17 is turned ON, blinks, or turned OFF to be used for, for example, informing that the rechargeable battery 21g is being charged, that the incoming signal is received, and the like. The LED 17 is not limited to a diode, and may be an arbitrary light emitting device which is low in power consumption, and which is used for announcement. An example of such a light emitting device is a predetermined part of a displaying screen of the display unit 15.

The power controller 21a is activated by the processor 11 at predetermined time intervals, and performs a control for appropriately charging the rechargeable battery 21g with the electric power supplied from the battery charger CH and that supplied from the solar cell SC. For the control, the electric powers are measured by measuring the electric power supplied from the battery charger CH by the charger power measuring unit 21c, and that supplied from the solar cell SC by the solar cell power measuring unit 21e. The amount of electric power stored in the rechargeable battery 21g is known by causing the battery voltage measuring unit 21h to measure the voltage of the battery. In order to avoid the possibility that the rechargeable battery 21g is overcharged, the charge control is performed on the basis of the result of the measurement of the battery voltage measuring unit 21h, and that of the battery temperature measuring unit 21i.

When the rechargeable battery 21g is to be charged by the electric power supplied from the battery charger CH, the power controller 21a controls the charger switch 21b to be turned ON, and, when the battery is to be charged by the electric power supplied from the solar cell SC, causes the solar cell switch 21d to be turned ON. In the charging operation in which the rechargeable battery 21g is charged by the electric power supplied from either of the devices, the charging voltage adjusting unit 21f is controlled so that the battery is charged at an appropriate charging voltage.

The charger switch 21b is a switch configured by an electronic circuit, and configured so that, when receiving instructions for turning-OFF from the power controller 21a, the electric power supplied from the battery charger CH is not supplied to the charging voltage adjusting unit 21f, and, when receiving instructions for turning-ON from the power controller 21a, the electric power is supplied to the charging voltage adjusting unit.

In accordance with instructions from the power controller 21a, the charger power measuring unit 21c measures the voltage and current which are supplied from the battery charger CH, calculates the supplied electric power, and informs the power controller 21a of the measured values. In the case where the charger switch 21b is turned OFF, the measured current is zero. Therefore, the supplied electric power is estimated from the measured voltage.

The solar cell switch 21d operates in the same manner as the charger switch 21b except that it is used for supplying or not supplying the electric power supplied from the solar cell SC, and therefore description of its operation will be omitted. Furthermore, the solar cell power measuring unit 21e operates in the same manner as the charger power measuring unit 21c except that it is used for measuring the electric power supplied from the solar cell SC, and therefore description of its operation will be omitted.

The charging voltage adjusting unit 21f converts both of the electric power supplied through the charger switch 21b, and that supplied through the solar cell switch 21d, to a charging voltage according to instructions from the power controller 21a, and then supplies the converted voltage to the rechargeable battery 21g.

In accordance with instructions from the power controller 21a, the battery voltage measuring unit 21h measures the voltage supplied from the rechargeable battery 21g, and informs the power controller 21a of the measured voltage. The battery temperature measuring unit 21i which is disposed in the vicinity of the rechargeable battery 21g is, for example, a thermistor, measures the temperature of the rechargeable battery 21g in accordance with instructions from the power controller 21a, and informs the power controller 21a of the measured temperature.

Figure 3:
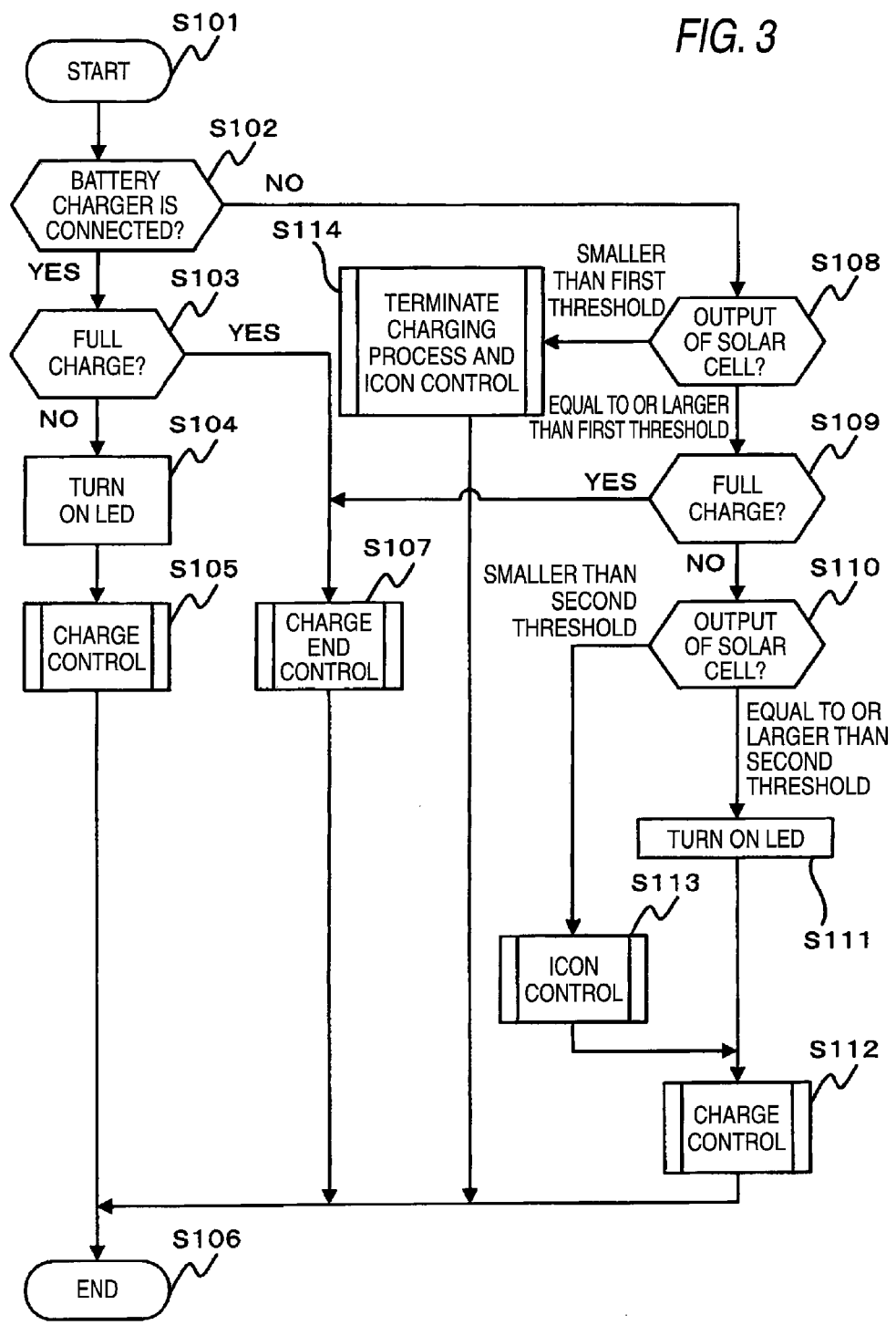
FIG. 3 is a flowchart (No. 1) of a controlling operation in which a power controller in the first embodiment of the invention appropriately charges a rechargeable battery and notifies a charge status.

Next, the controlling operation in which the power controller 21a of the mobile communication apparatus MS appropriately charges or does not charge the rechargeable battery 21g, and notifies the charge status will be described with reference to the flowchart shown in FIG. 3.

The power controller 21a is intermittently activated by the processor 11 to start the controlling operation (step S101). For example, the activation is performed at constant time intervals in synchronization with the intermittent activation of the signal processor 13 by the processor 11.

The power controller 21a controls the charger power measuring unit 21c so as to measure the voltage and the current to check whether the battery charger CH is connected or not (step S102). If a non-zero current is measured by the charger power measuring unit 21c, it is determined that the battery charger CH is connected. If the charger switch 21b is turned OFF and the voltage is measured as zero, it is determined that the battery charger is not connected. Furthermore, if a voltage which is equal to or higher than a predetermined voltage threshold is measured, it is determined that the battery charger is connected. In another case, the charger switch 21b is turned OFF for a short time period, and the determination is performed on the basis of the voltage which is obtained at the turning OFF.

If it is determined that the battery charger CH is connected, the power controller 21a controls the battery voltage measuring unit 21h so as to measure the voltage supplied from the rechargeable battery 21g to check whether the rechargeable battery 21g is in the full charge state or not (step S103). During the measurement, the charger switch 21b and the solar cell switch 21d are turned OFF for a short time period. If the measured voltage is equal to or higher than a predetermined full-charge threshold, it is determined that the battery is fully charged, and, if the measured voltage is lower than the full-charge threshold, it is determined that the battery is not fully charged.

Despite the above determinations, if a predetermined maximum charging period has elapsed from the start of the charging operation, the power controller 21a determines that the battery is fully charged. The time period from the start of the charging operation is calculated as the difference which is obtained by subtracting the charge loss time period stored in the power controller 21a from the elapsed time period from the charging start time stored in the power controller 21a to the current time. The maximum charging period is about one hour.

If it is determined that the battery is not fully charged, the power controller 21a controls the LED 17 to be turned ON to conduct a predetermined charge notification lighting operation (step S104), performs a control in which the rechargeable battery 21g is charged by the electric power supplied from the battery charger CH (step S105), and then ends the controlling operation (step S106). The controlling operation of charging the battery in step S105 will be described later in detail.

By contrast, if it is determined that the battery is fully charged, namely, if the charging of the rechargeable battery 21g is completed, the power controller 21a performs a control in which the charging of the rechargeable battery 21g is ended (step S107), and then ends the controlling operation (step S106). The controlling operation in which the charging is ended in step S107 will be described later in detail. As a result of the operation in step S107, the LED 17 is turned OFF. Therefore, the state where the charging operation is being performed is informed by turning-ON of the LED 17, and the completion of the charging operation is informed by turning-OFF of the LED.

If it is determined in step S102 that the battery charger CH is not connected, the power controller 21a controls the solar cell power measuring unit 21e so as to measure the electric power supplied from the solar cell SC, and then checks whether the electric power is equal to or larger than a first solar cell output threshold or not (step S108).

The first solar cell output threshold is electric power which is approximately equal to or smaller than that consumed in the illustrated controlling operation of the power controller 21a, and that consumed in the turning-ON of the LED 17. Since the controlling operation is intermittently performed, electric power which is reduced while assuming that constant electric power is always consumed is regarded as the electric power which is consumed in the operation. Also the consumed electric power in the case where the LED 17 is intermittently turned ON is similarly reduced.

If it is determined that the measured electric power is equal to or larger than the first solar cell output threshold, the power controller 21a checks whether the rechargeable battery 21g is in the full charge state or not (step S109). The checking operation is identical with that of step S103, and hence its detailed description will be omitted. The maximum charging period in the operation of step S109 may be different from that in the operation of step S103 because of the following reason. The battery charger CH supplies electric power which is ideal for charging the rechargeable battery 21g, but the solar cell SC fails to always supply the ideal electric power. Therefore, the maximum charging period in the operation of step S109 may be differentiated by a predetermined ratio, for example, about 30% from that in the operation of step S103. However, a difference of several tens of percents is not preferable because of the following reason. In the case where, although charging is performed for a long time period, the completion of the charging operation is not informed, or the completion of the charging operation is informed as a result of charging for short time period, there is a possibility that the user of the mobile communication apparatus MS may feel a sense of strangeness. Moreover, there is a further possibility that the user may misunderstand that an abnormality occurs in the operation of charging the rechargeable battery 21g.

The setting in which the maximum charging period in the operation of step S109 is longer than that in the operation of step S103 is performed because the electric power supplied from the solar cell SC is smaller than that supplied from the battery charger CH, so that the time period required for charging the rechargeable battery 21g to the full charge state is longer. By contrast, the setting in which the time period is shorter is performed because it is avoided that the rechargeable battery 21g is set in a near full charge state for a long time period.

If it is determined that the battery is not fully charged, the power controller 21a checks whether the electric power output from the solar cell SC is equal to or larger than a second solar cell output threshold or not (step S110). The second solar cell output threshold exceeds the first solar cell output threshold. The output electric power is the electric power which is obtained in step S108, and hence is not required to be newly measured by the solar cell power measuring unit 21e.

The second solar cell output threshold is equal to the electric power supplied from the battery charger CH, or alternatively electric power which is required for appropriately charging the rechargeable battery 21g, or electric power which is required for fully charging the rechargeable battery 21g. Usually, the supplied electric power and the required electric power are designed or set in a surplus manner. Therefore, electric power which is equal to or larger than a predetermined ratio, for example, about 70% of these electric powers are deemed as the equal electric power. As a result, it is apparent that the second solar cell output threshold has a value which exceeds the first solar cell output threshold.

If it is determined that the measured electric power is equal to or larger than the second solar cell output threshold, the power controller 21a controls the LED 17 to be turned ON to conduct the predetermined charge notification lighting operation (step S111), performs a control in which the rechargeable battery 21g is charged by the electric power supplied from the solar cell SC (step S112), and then ends the controlling operation (step S106).

The turning-ON operation in step S111 is identical with the operation in step S104, but not limited to be strictly identical therewith. The color, pattern, or the like of the lighting may be differentiated so as to also inform of the charging operation by the battery charger CH or that by the solar cell SC. The operation in step S112 is identical with that in step S105.

If it is determined that the measured electric power is smaller than the second solar cell output threshold, the power controller 21a controls the display unit 15 so as to display an icon, or so as not to display an icon (step S113), controls so that the rechargeable battery 21g is charged by the electric power supplied from the solar cell SC (step S112), and then ends the controlling operation (step S106). The operation of the icon control in step S113 will be described later in detail. As a result of the operation in step S113, the LED 17 is turned OFF.

If it is determined in step S109 that the battery is in the full charge state, the power controller 21a performs a control of ending the charging of the rechargeable battery 21g (step S107), and the controlling operation is ended (step S106). Irrespective of the charging operation by the battery charger CH or that by the solar cell SC, the LED 17 is turned ON during the charging operation, and, when the battery reaches full charge, the LED 17 is turned OFF. Therefore, the user is not required to perform an operation in consideration of the power supply source of the charging electric power.

If it is determined that the electric power measured in step S108 is smaller than the first solar cell output threshold, the power controller 21a performs a control of ending the charging of the rechargeable battery 21g including a control of displaying an icon on the display unit 15, or not displaying the icon (step S114), and the controlling operation is ended (step S106). The controlling operation in which the charging is ended in step S114 will be described later in detail. As a result of the operation of step S114, the LED 17 is turned OFF.

The electric power output from the solar cell SC is changed depending on the intensity of incident light. When the change is steep, the determination of step S108, or that in step S110 may be frequently changed each time when the power controller 21a operates. This causes the operation of turning ON the LED 17 in step S111, and that of turning OFF the LED 17 in step S113 to be frequently performed in an alternate manner, thereby producing a possibility that the user of the mobile communication apparatus MS may feel a sense of strangeness. Moreover, there is a further possibility that the user may misunderstand that an abnormality occurs in the operation of charging the rechargeable battery 21g.

In order to prevent the determinations from being frequently changed, therefore, the power controller 21a performs one or a plurality of the following operations. A first operation is an operation which is based on hysteresis, and in which a first threshold and a second threshold that exceeds the first threshold are disposed in each of the steps. If the value (in this case, the electric power) is equal to or larger than the second threshold, the value is determined to be equal to or larger than the threshold, and, if the value is smaller than the first threshold, the value is determined to be smaller than the threshold. If the value is equal to or larger than the first threshold, and smaller than the second threshold, the immediately previous determination is maintained.

A second operation is an operation which is based on continuance of determinations. If, after a certain determination is performed, a determination which is different from the certain determination is continuously performed a plurality of times, it is determined that the different determination is performed, and, during a period until the determination is continuously performed a plurality of times, the immediately previous determination is maintained. A third operation is an operation which is based on an average value. An average of values which are obtained in past operations of a predetermined number of times is compared with the threshold. The average value may be calculated while a greater weight is provided to a nearer past value.

Figure 4:
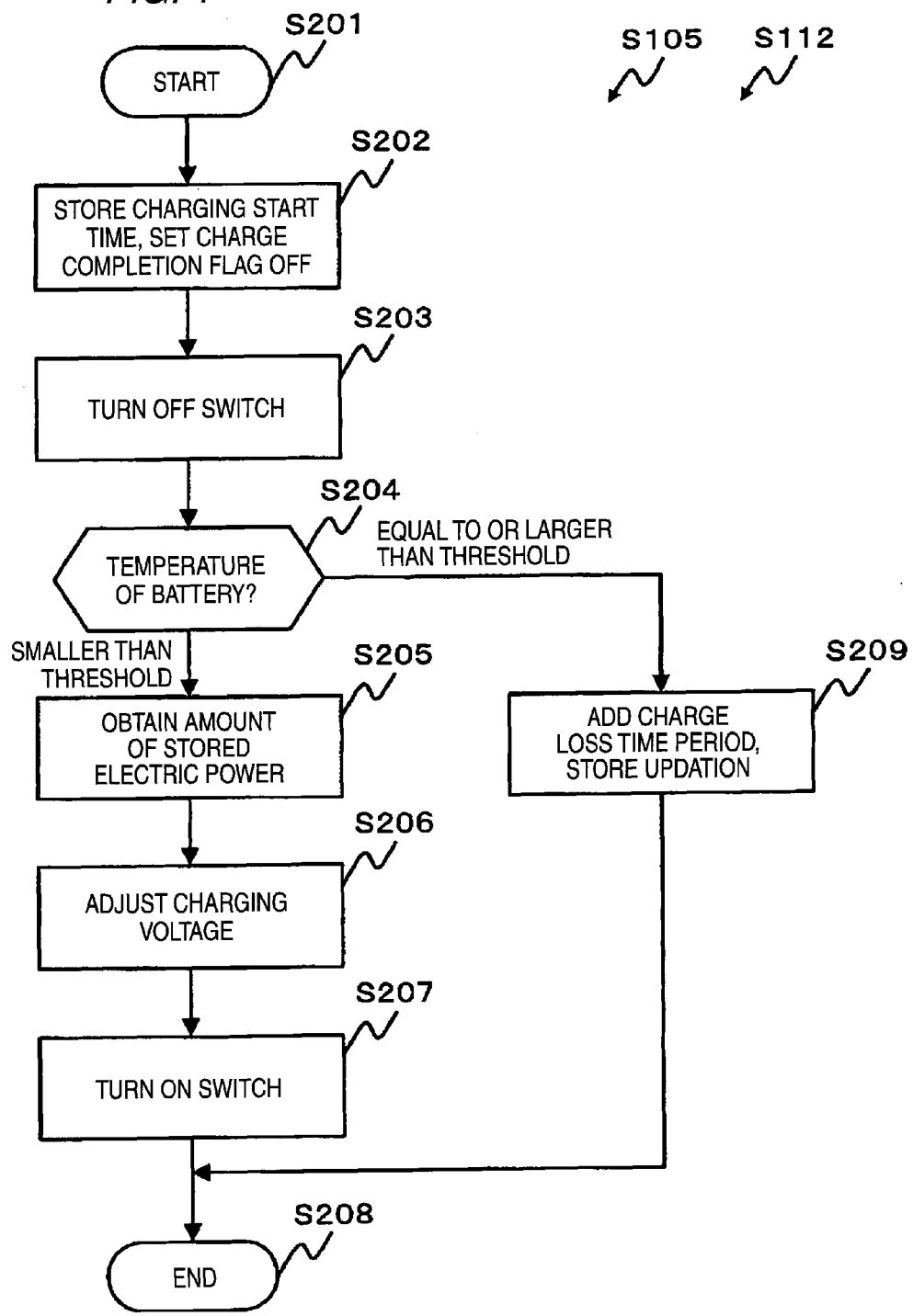
FIG. 4 is a flowchart (No. 2) of the controlling operation in which the power controller in the first embodiment of the invention appropriately charges the rechargeable battery and notifies the charge status.

The charge controlling operation of the power controller 21a in step S105 will be described in detail with reference to the flowchart shown in FIG. 4. The controlling operation is identical with the charge controlling operation in step S112. In the start of the controlling operation, however, a notice indicating that the operation belongs to which step is informed.

The power controller 21a starts the charge controlling operation (step S201). If it is determined that a new charging operation is started, the charging start time stored in the power controller 21a is stored, and a charge completion flag stored in the power controller 21a is set OFF (step S202).

Namely, the interval of times when the power controller 21a performs the operation is constant. If the difference between the current time and the stored charging start time is equal to the interval, therefore, the charging operation is continued, and no storage operation is performed on the charging start time and the charge completion flag. If the difference is equal to or larger than, for example, several times the interval, it is determined that a charging operation which has been once ended is resumed, and the power controller 21a stores the current time as the stored charging start time, and sets the charge completion flag to OFF.

Then, the power controller 21a turns OFF a switch (step S203). In the case where the operation in step S105 is being performed and the charging operation is performed by the electric power supplied from the battery charger CH, the switch is the charger switch 21b, and, in the case where the operation in step S112 is being performed and the charging operation is performed by the electric power supplied from the solar cell SC, the switch is the solar cell switch 21d.

The power controller 21a checks the temperature of the rechargeable battery 21g which is measured by the battery temperature measuring unit 21i (step S204). If the temperature is lower than a predetermined temperature threshold, it is determined that the rechargeable battery 21g is not in a state where deterioration due to elevated temperature proceeds, and the charging operation is started. The temperature of the rechargeable battery 21g is raised not only by charging, but also by discharging.

Namely, the power controller 21a obtains the amount of electric power stored in the rechargeable battery 21g on the basis the voltage measured by the battery voltage measuring unit 21h (step S205), instructs the charging voltage adjusting unit 21f to supply electric power of the optimum charging voltage which depends on the electric power amount (step S206), turns ON the switch (step S207), and ends the charge controlling operation (step S208). The switch in step S207 is the switch which is turned OFF in step S203.

If the temperature measured in step S204 is equal to or higher than the predetermined temperature threshold, the power controller 21a updates the charge loss time period stored in the power controller 21a by adding the interval of times when the power controller 21a performs the operation, and stores the updated time (step S209), and then ends the charge controlling operation (step S208). During this process, the switch is not turned ON, so that the charging operation is not performed, and the turning-ON/turning-OFF of the LED 17 is maintained.

In place of or in addition to the process in step S209 in which the charging operation is not performed, the power controller 21a may perform the charging operation at a voltage which is lower than the optimum changing voltage obtained in step S206. As the measured voltage is higher, the charging operation is performed at a lower voltage.

In the determining operation in step S204, when the measured temperature is near the predetermined temperature threshold, there is a possibility that the determination is frequently changed. Therefore, the power controller 21a performs the determination in step S204 by the operation which is based on hysteresis. According to the operation, the temperature of the rechargeable battery 21g can be prevented from being excessively raised. The operation which is based on hysteresis is identical with that described in the description of the determination in step S108 and/or that in step S110.

Figure 5:
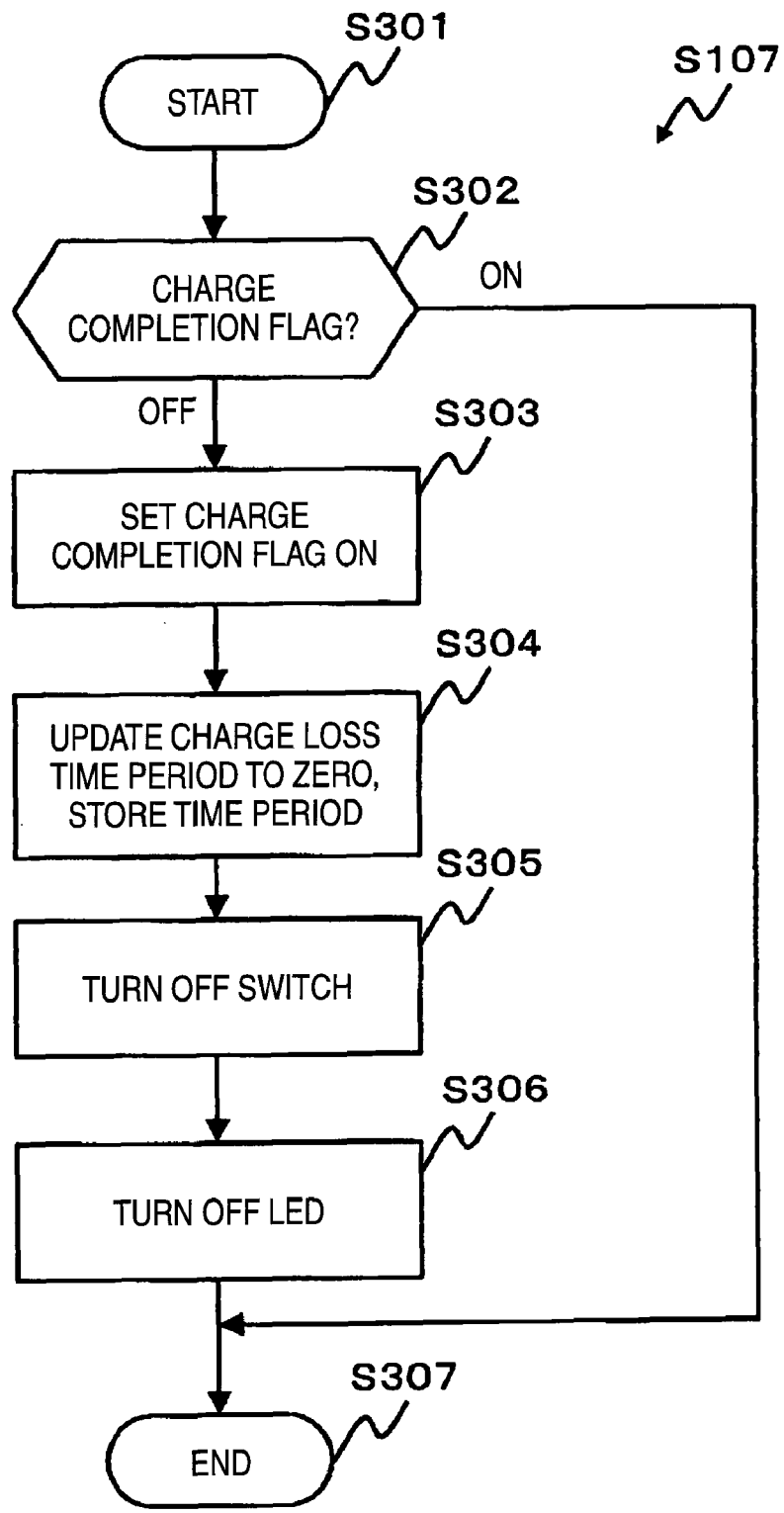
FIG. 5 is a flowchart (No. 3) of the controlling operation in which the power controller in the first embodiment of the invention appropriately charges the rechargeable battery and notifies the charge status.

The controlling operation in step S107 in which the charging operation is ended by the power controller 21a will be described in detail with reference to the flowchart shown in FIG. 5. The power controller 21a starts the controlling operation of ending the charging operation (step S301), and checks whether the charge completion flag stored in the power controller 21a is set ON or OFF (step S302).

If the charge completion flag is set OFF, the power controller 21a sets the flag to ON (step S303), updates the charge loss time period to zero (step S304), turns OFF the switch (step S305), turns OFF the LED 17 (step S306), and ends the controlling operation of ending the charging operation (step S307). Here, the term "switch" means the charger switch 21b and the solar cell switch 21d.

On the other hand, if the charge completion flag is set ON, the power controller 21a immediately ends the controlling operation of ending the charging operation (step S307). Irrespective of the value which is set as the charge completion flag, alternatively, the operation in step S304 or step S306 may be performed. Even in this case, there arises no problem from the viewpoint of appropriate charging.

However, the charge completion flag which is set ON means that the operation in step S107 is repeated without performing the charging operation (the operation in step S105 or step S112). In the case where the rechargeable battery 21g is fully charged, the controlling operation in step S107 of ending the charging operation is executed many times. It is strongly requested to reduce the power consumption. Therefore, the controlling operation in which the charge completion flag is referred is preferable.

Figure 6:
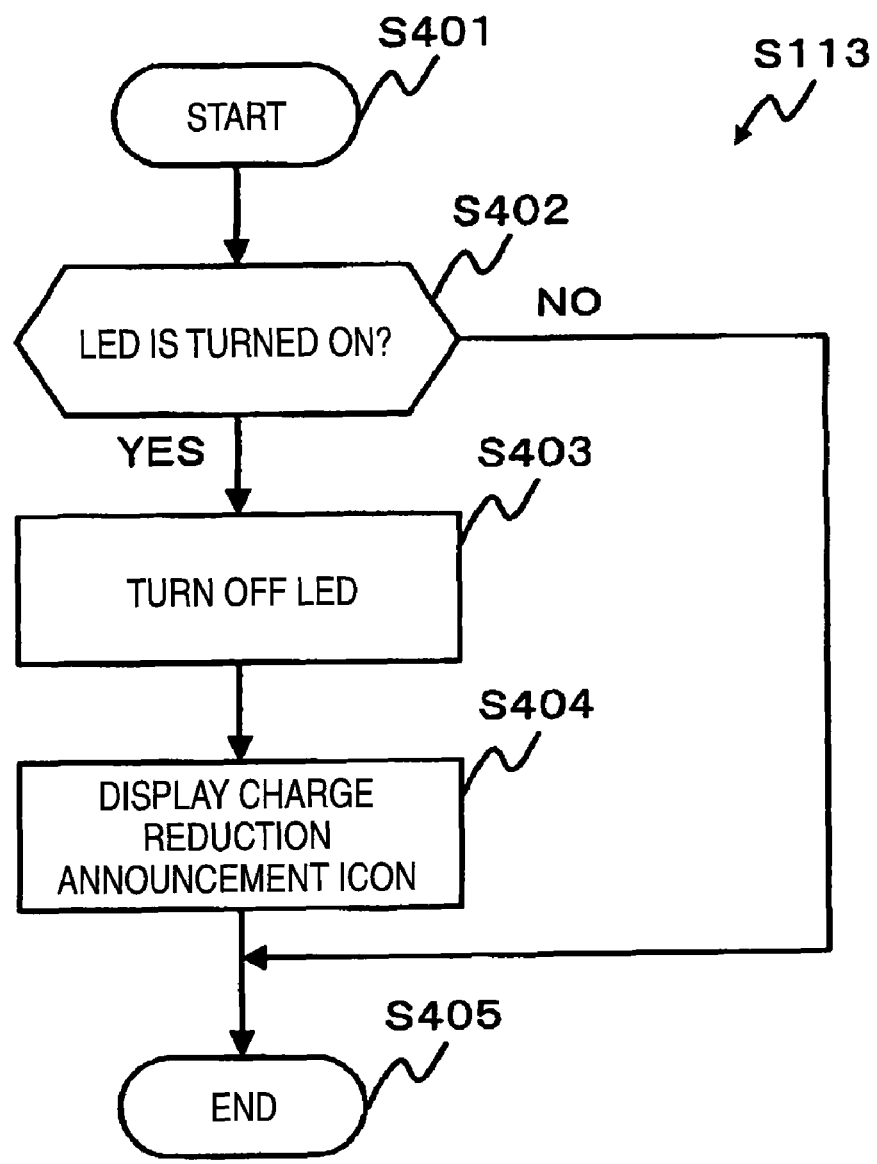
FIG. 6 is a flowchart (No. 4) of the controlling operation in which the power controller in the first embodiment of the invention appropriately charges the rechargeable battery and notifies the charge status.

The controlling operation of the power controller 21a in step S113 of displaying or not displaying the icon on the display unit 15 will be described in detail with reference to the flowchart shown in FIG. 6. The power controller 21a starts the controlling operation (step S401), and checks whether the LED 17 is conducting the predetermined charge notification lighting operation or not (step S402). The lighting operation is conducted in step S104 or step S111.

If it is determined that the LED 17 is turned ON, the power controller 21a turns OFF the LED (step S403), controls the display unit 15 so as to display a charge reduction announcement icon (step S404), and ends the controlling operation (step S405). By contrast, if it is determined that the LED is not turned ON, the power controller 21a immediately ends the controlling operation (step S405).

Here, the charge reduction announcement icon will be described. The icon is displayed for announcing that, for example, the intensity of the sunlight is reduced and the charging is lowered or ended without completion. Namely, also after the operation in step S113, the rechargeable battery 21g is charged by the electric power supplied from the solar cell SC. However, the charging is lowered as compared with that performed by the electric power supplied from the solar cell SC.

If it is determined in step S402 that the LED 17 is turned ON, the lighting of the LED 17 is turned OFF in step S403. Consequently, there is a possibility that the user of the mobile communication apparatus MS may misunderstand that the rechargeable battery 21g is fully charged and the charging is completed (it is determined in step S103 or S109 that the battery is fully charge). In order to prevent the misunderstanding from occurring, therefore, the power controller 21a controls the icon to be displayed.

The icon is displayed together with a message indicating, for example, that the sunlight weakens. When a predetermined key operation is conducted on the user interface 16, i.e., when the user of the mobile communication apparatus MS performs an input operation indicative of understanding, the display is turned OFF by the processor 11. When the icon is to be displayed, in the case where the display of the display unit 15 is interrupted (including the case where the mobile communication apparatus MS is of the folding type, the display unit 15 is disposed at a position which can be viewed when the fold is opened, and the display is not performed on the display unit 15 because the fold is closed), the power controller 21a does not request resumption of the display. When the display is resumed by a key operation on the user interface 16, for example, it is sufficient for the user to know that the charging is lowered or ended without completion. Therefore, the resumption of the display is not requested in order to avoid the increase of the power consumption due to the resumption.

Figure 7:
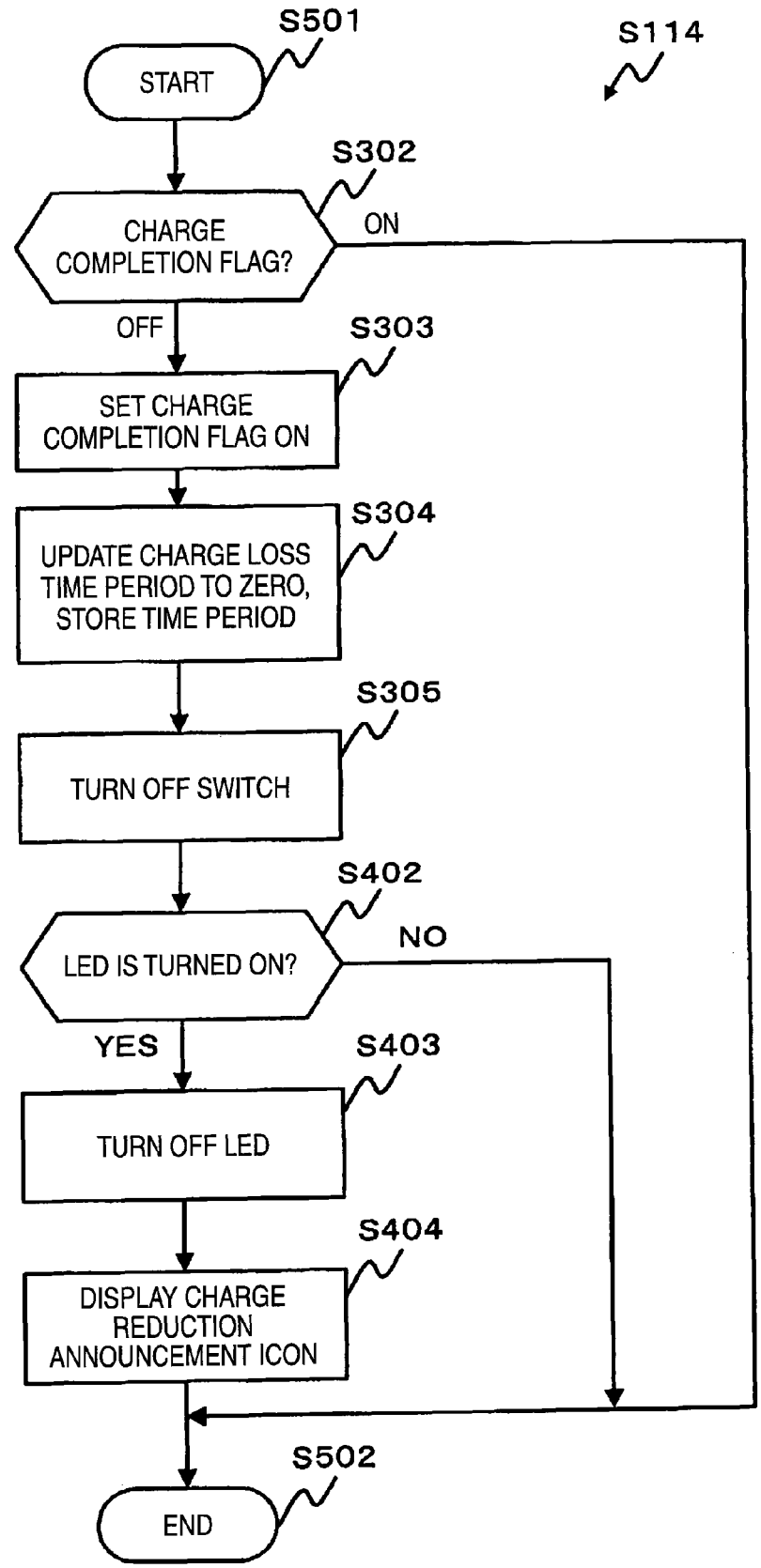
FIG. 7 is a flowchart (No. 5) of the controlling operation in which the power controller in the first embodiment of the invention appropriately charges the rechargeable battery and notifies the charge status.

The controlling operation of the power controller 21a in step S114 of ending the charging of the rechargeable battery 21g including the control in step S114 of displaying the icon on the display unit 15, or not displaying the icon will be described in detail with reference to the flowchart shown in FIG. 7. The controlling operation is a combination of the controlling operation which has been described with reference to FIG. 5, and in which the charging operation is ended, and that which has been described with reference to FIG. 6, and in which the icon is displayed or not displayed on the display unit 15. Therefore, the identical operation steps are denoted by the same reference numerals, and their description will be omitted.

The power controller 21a starts the controlling operation (step S501). After the controlling operation in steps S302 to S305 of ending the charging operation, the portion performs the controlling operation in steps S402 to S404 which relates to the charge reduction announcement icon, and then ends the controlling operation (step S502).

The advantage which is obtained by referring the charge completion flag has been described in the description of the controlling operation which has been described with reference to FIG. 5, and in which the charging operation is ended. The controlling operation in step S114 in which the charging operation is ended is not executed in the case where the rechargeable battery 21g is fully charged, but executed many times in the case where the electric power output from the solar cell SC is small and the situation is close to the state where the charging operation is not performed. When a large power is consumed in the controlling operation in this case, therefore, there arises a possibility that the provision of the solar cell SC on the contrary reduces the electric power stored in the rechargeable battery 21g. Namely, it is more strongly requested to reduce the power consumption, and the controlling operation in which the charge completion flag is referred is further preferable.

In step S114, the interval of activations of the power controller 21a may be prolonged, or, for example, the portion may be activated one time for a plurality of intermittent activations of the signal processor 13. According to the configuration, the power consumption in the case where the battery charger CH is not connected and the electric power output from the solar cell SC is small can be further reduced. In the cases where it is determined in step S102 that the battery charger CH is connected, and where it is determined in step S108 that the output of the solar cell SC is equal to or larger than the first solar cell output threshold, the intervals may be returned to the original value, so that a quick response to a user's operation is again realized.

Second Embodiment

Figure 8:
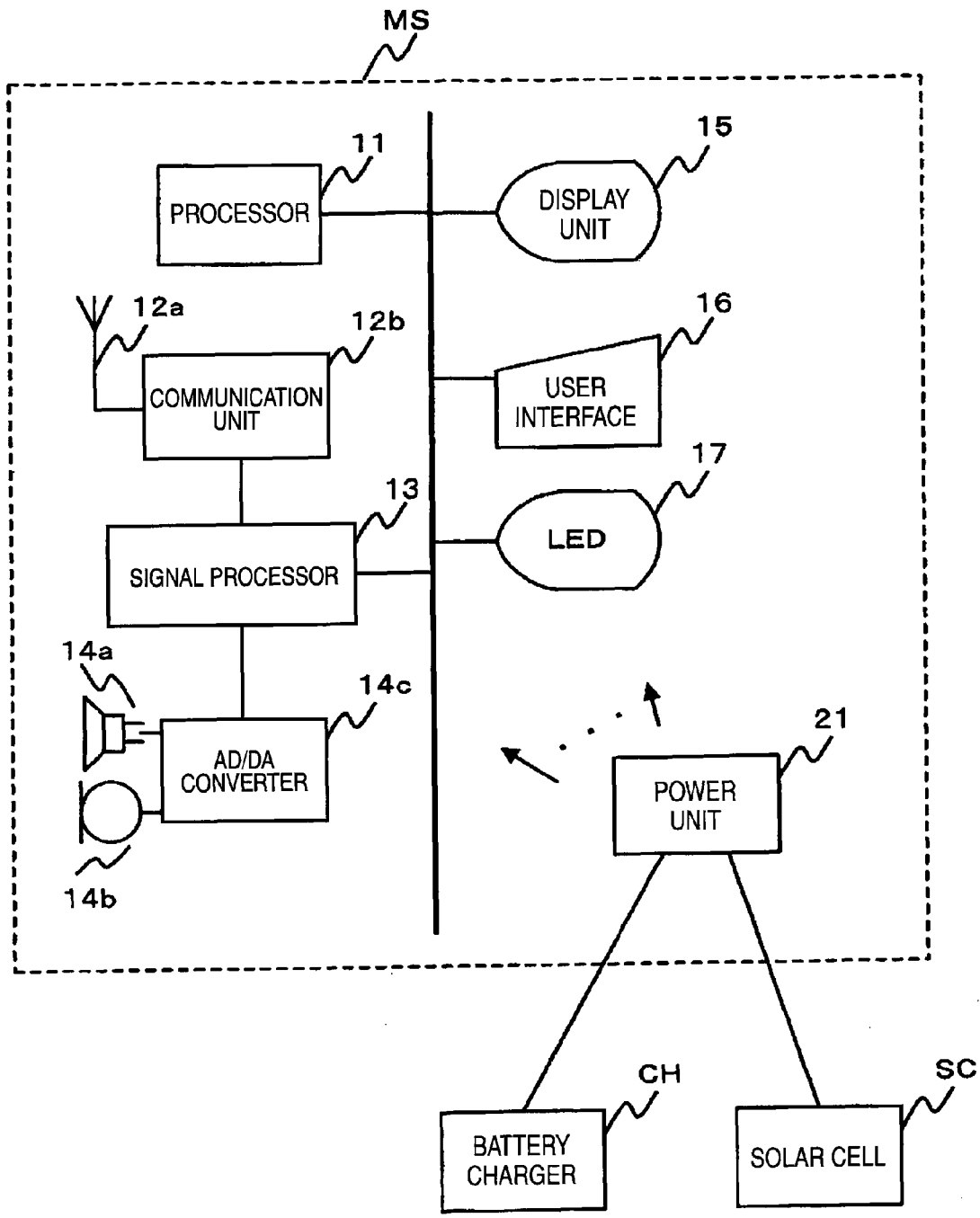
FIG. 8 is a block diagram showing the configuration of a mobile communication apparatus of a second embodiment of the invention.

FIG. 8 is a block diagram showing the configuration of a mobile communication apparatus MS of a second embodiment of the invention. The configuration is similar to that of the mobile communication apparatus MS of the first embodiment. Therefore, the identical components are denoted by the same reference numerals, and their description will be omitted. Only differences will be described below.

The mobile communication apparatus MS is not provided with the solar cell SC, and the power unit 21 is connected to the battery charger CH and/or the solar cell SC. As a result, the configuration of the power unit 21 is identical with that of the power unit 21 in the first embodiment shown in FIG. 2, except that charging electric power is supplied from the solar cell SC to the solar cell switch 21d through a detachable second connector (not shown).

The operations of various portions of the mobile communication apparatus MS of the second embodiment of the invention are identical with those of the mobile communication apparatus MS of the first embodiment, and their description will be omitted. In the case where, irrespective of the electric power output from the solar cell SC, it can be detected whether the solar cell SC is connected to the second connector or not, if it is detected that the connection is not made, the power controller 21a determines in step S108 of FIG. 3 that the electric power output from the solar cell SC is smaller than the first solar cell output threshold, so that the power consumption can be reduced.

The detection whether the solar cell SC is connected or not can be performed in the following manner. Among pins of the second connector disposed in the mobile communication apparatus MS, a plurality of pins which are not used for supplying the electric power from the solar cell SC are, for example, connected to be short-circuited when the solar cell SC is connected, or a mechanical switch is disposed in the vicinity of the connector may enable the detection.

Modifications of Second Embodiment

In the second embodiment, it is assumed that both the battery charger CH and the solar cell SC may be connected to the mobile communication apparatus MS. Alternatively, the mobile communication apparatus MS may be configured so that it has the first connector and does not have the second connector. In this configuration, one of the battery charger CH and the solar cell the solar cell SC may be sometimes connected through the first connector.

According to the configuration, the solar cell switch 21d and solar cell power measuring unit 21e which are shown in FIG. 2 are not necessary. On the other hand, the power controller 21a must determine whether either of the battery charger CH and the solar cell SC is connected to the first connector. This determination is performed on the basis of the quality of the electric power which is supplied through the first connector. The quality of the electric power means the amount of the electric power, the variation of the electric power, the presence/absence of ripples, and the like.

Alternatively, the power controller 21a may assume that the solar cell SC is connected, without performing the determination, and performs the controlling operation. According to the controlling operation, irrespective of the amount of the supplied electric power, an appropriate charging operation is enabled, and it is naturally possible to perform the optimum charging operation by the stable electric power supplied from the battery charger CH.

Other Embodiments

In the above-described embodiments, the rechargeable battery 21g is charged by electric power supplied from the battery charger CH and that supplied from the solar cell SC. However, the invention is not limited to them. Alternatively, the battery may be charged by electric power supplied from a dry cell, a secondary battery, a hand crank generator, a fuel cell, or the like.

The electric power supplied from a dry cell, a secondary battery such as a lead storage battery, or a hand crank generator is stable in a degree similar to the electric power supplied from the battery charger CH. Therefore, it is appropriate to perform the same control as that in the case of the charging by the electric power supplied from the battery charger CH. Furthermore, electric power supplied from a fuel cell is gradually increased after the fuel is introduced, and, when the introduced fuel is exhausted, is gradually decreased, so that the electric power may not be constant. Therefore, it is appropriate to perform the same control as that in the case of the charging by the electric power supplied from the solar cell SC.

Although the description has been made by exemplifying the mode in which the invention is applied to a mobile communication apparatus, the present invention is not limited to the mode. The present invention can naturally be applied to any kind of apparatus which is operated by electric power stored in a rechargeable battery. The present invention is not limited to the above-described configurations, and may be variously modified.

Although the embodiment according to the present invention has been described above, the present invention is not limited to the above-mentioned embodiments but can be variously modified. Constituent components disclosed in the aforementioned embodiments may be combined suitably to form various modifications. For example, some of all constituent components disclosed in one of the embodiments may be removed or the constituent components disclosed in different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a rechargeable battery that is electrically connected to a charging electric power generating device;
a switch that is disposed to electrically connect the charging electric power generating device and the rechargeable battery;
an electric power measuring unit that measures electric power produced by the charging electric power generating device;
a charge controller that controls the switch to be turned OFF when the electric power measured by the electric power measuring unit is smaller than a first electric power threshold; and
an indicator,
wherein the charge controller operates to:
 (a) turn OFF the indicator and turn ON the switch when the electric power is equal to or larger than the first electric power threshold and smaller than a second electric power threshold that is higher than the first electric power threshold while a charging operation is not completed;
 (b) turn ON the indicator and the switch when the electric power is equal to or larger than the second electric power threshold while the charging operation is not completed; and
 (c) turn OFF the indicator and the switch when the charging operation is completed.

2. The apparatus of claim 1,
wherein the charging electric power generating device comprises a solar cell.

3. The apparatus of claim 1 further comprising:
a display unit,
wherein the charge controller controls the display unit to display a predetermined indication when the electric power is changed from a value that is equal to or larger than the second electric power threshold to a value that is smaller than the second electric power threshold while the charging operation is not completed.

4. An information processing apparatus comprising:
an indicator;
a rechargeable battery that is electrically connected to a first charging electric power generating device and a second charging electric power generating device;
a first switch that is disposed between the rechargeable battery and the first charging electric power generating device;
a second switch that is disposed between the rechargeable battery and the second charging electric power generating device;
an electric power measuring unit that measures first electric power produced by the first charging electric power generating device; and
a charge controller that operates to:
 (a) turn ON the indicator and the second switch when a second electric power is supplied from the second charging electric power generating device while charging operation of the rechargeable battery is not completed;
 (b) turn OFF the indicator and the first switch when the first electric power is smaller than a first electric power threshold while charging operation of the rechargeable battery is not completed and while the second electric power is not being supplied;
 (c) turn OFF the indicator and turn ON the first switch when the first electric power is equal to or larger than the first electric power threshold and smaller than a second electric power threshold that is higher than the first electric power threshold while the charging operation is not completed and while the second electric power is not being supplied; and
 (d) turn ON the indicator and the first switch when the electric power is equal to or larger than the second electric power threshold while the charging operation is not completed and while the second electric power is not being supplied.

5. The apparatus of claim 4,
wherein the first charging electric power generating device comprises a solar cell, and
wherein the second charging electric power generating device comprises a battery charger that converts a commercial power source to the second electric power for charging the rechargeable battery.

6. The apparatus of claim 4,
wherein the first electric power threshold is equal to or smaller than electric power that is consumed the indicator being turned ON.

7. The apparatus of claim 4,
wherein the second electric power threshold is equal to electric power supplied from the second charging electric power generating device.

8. The apparatus of claim 4 further comprises:
a display unit,
wherein the charge controller further operates to:
 (e) control the display unit to display a predetermined indication when the first charging electric power is changed from a value that is equal to or larger than the second electric power threshold to a value that is smaller than the second electric power threshold while the charging operation is not completed and while the second electric power is not being supplied from the second charging electric power generating device; and
 (f) turn OFF the indicator, the first switch and the second switch when the charging operation is completed.

9. A method for charging a rechargeable battery electrically provided in an information processing apparatus and connected to a charging electric power generating device through a switch disposed to electrically connect the charging electric power generating device and the rechargeable battery, the method comprising:
measuring electric power produced by the charging electric power generating device; and
controlling the switch to be turned OFF when the electric power is smaller than a first electric power threshold; and
controlling an indicator and the switch so as to:
 turn the indicator OFF and turn ON the switch when the electric power is equal to or larger than the first electric power threshold and smaller than a second electric power threshold that is higher than the first electric power threshold while a charging operation is not completed;

turn ON the indicator and the switch when the electric power is equal to or larger than the second electric power threshold while the charging operation is not completed; and turn OFF the indicator and the switch when the charging operation is completed.

10. The method of claim 9,
wherein the charging electric power generating device comprises a solar cell.

11. The method of claim 9,
wherein the information processing apparatus comprises a display unit, and
wherein the method further comprises:
controlling the display unit to display a predetermined indication when the electric power is changed from a value that is equal to or larger than the second electric power threshold to a value that is smaller than the second electric power threshold while the charging operation is not completed.

* * * * *